United States Patent
Imai et al.

(10) Patent No.: US 7,374,090 B2
(45) Date of Patent: May 20, 2008

(54) OPTICAL ENCODER WITH RESINOUS CODE PLATE

(75) Inventors: Keisuke Imai, Yamanashi (JP); Hiroya Terashima, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 142 days.

(21) Appl. No.: 10/819,149

(22) Filed: Apr. 7, 2004

(65) Prior Publication Data

US 2004/0195331 A1    Oct. 7, 2004

(30) Foreign Application Priority Data

Apr. 7, 2003    (JP)    ............................. 2003-102970

(51) Int. Cl.
  *G06K 7/10*    (2006.01)
  *G06K 7/14*    (2006.01)
(52) U.S. Cl. ...................................... 235/454; 235/435
(58) Field of Classification Search ................ 235/454, 235/435; 264/219
  See application file for complete search history.

(56) References Cited

U.S. PATENT DOCUMENTS

2001/0003384 A1 * 6/2001 Morita ........................ 264/219

FOREIGN PATENT DOCUMENTS

| GB | 2178529 A | * | 2/1987 |
|---|---|---|---|
| JP | 62-003616 | | 1/1987 |
| JP | 62-265523 | | 11/1987 |
| JP | 08-021745 | | 1/1996 |
| JP | 11-153453 | | 6/1999 |
| JP | 11-287671 | | 10/1999 |

OTHER PUBLICATIONS

Office Action for Japanese Patent Application No. 2003-102970 mailed Jun. 7, 2005.
Japanese Office Action for Application No. JP-A-2003-102970 mailed May 23, 2006.
European Search Report issued on Mar. 15, 2007.

* cited by examiner

*Primary Examiner*—Lisa Caputo
(74) *Attorney, Agent, or Firm*—Staas & Halsey LLP

(57) ABSTRACT

An optical encoder, including a light emitting section; a light receiving section; and a resinous code plate disposed movably relative to the light emitting section and the light receiving section. The resinous code plate includes, on the plate face thereof, a plurality of tracks respectively provided with molded code-pattern surfaces different from each other, and a local structured-surface area formed between the tracks arranged side-by-side relative to each other, the local structured-surface area possessing a surface configuration different from the molded code-pattern surfaces of the tracks. The molded code-pattern surface of each of the tracks includes a flat surface area and an irregular surface area, adjacent to each other as seen in the extending direction of the track. The local structured-surface area is formed between the flat surface area of the molded code-pattern surface of one track and the irregular surface area of the molded code-pattern surface of another track arranged side-by-side relative to the one track. The irregular surface area of the molded code-pattern surface includes a first linear structure extending in a predetermined direction, and the local structured-surface area includes a second linear structure extending in a direction intersecting the first linear structure of the irregular surface area.

12 Claims, 11 Drawing Sheets

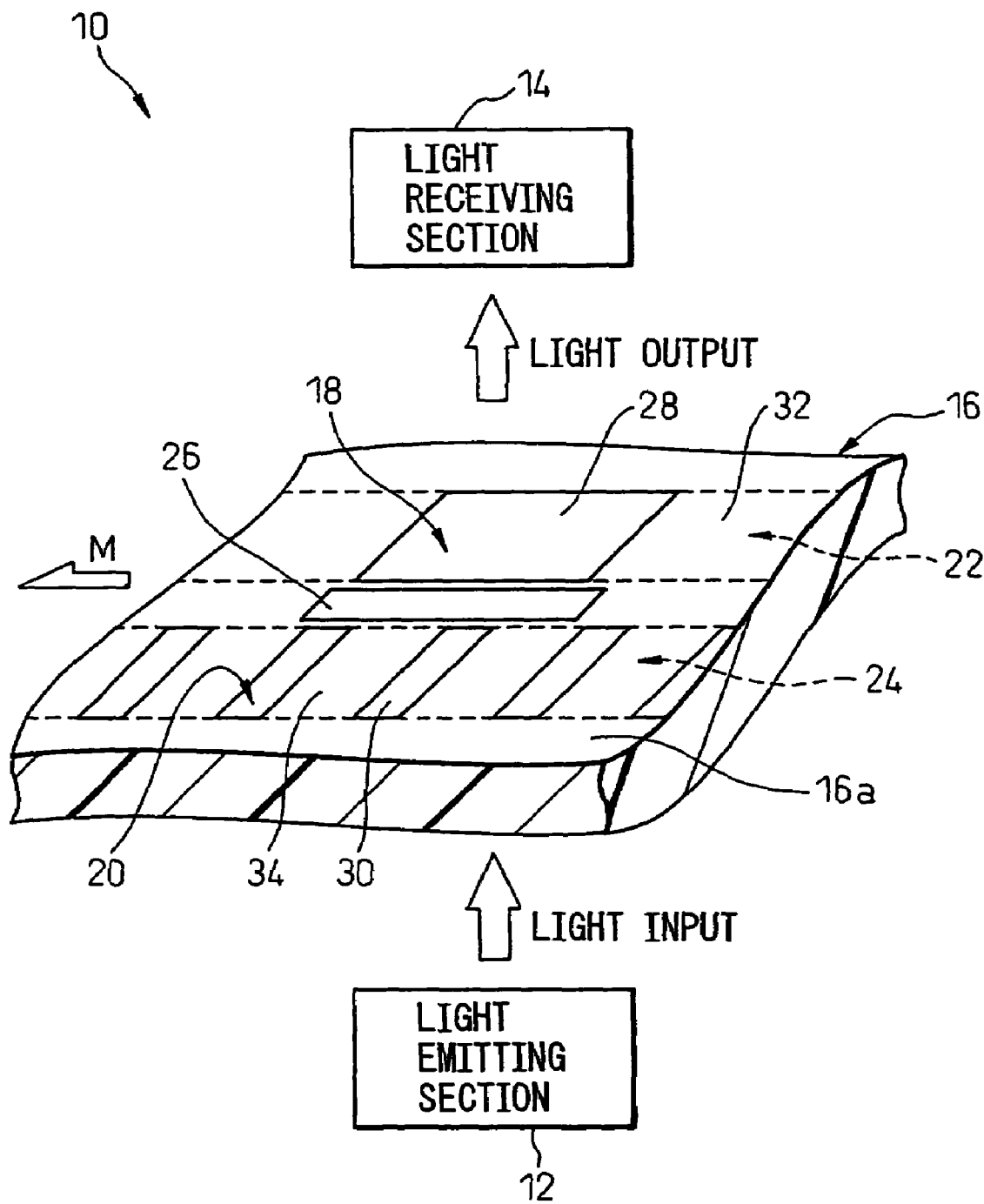

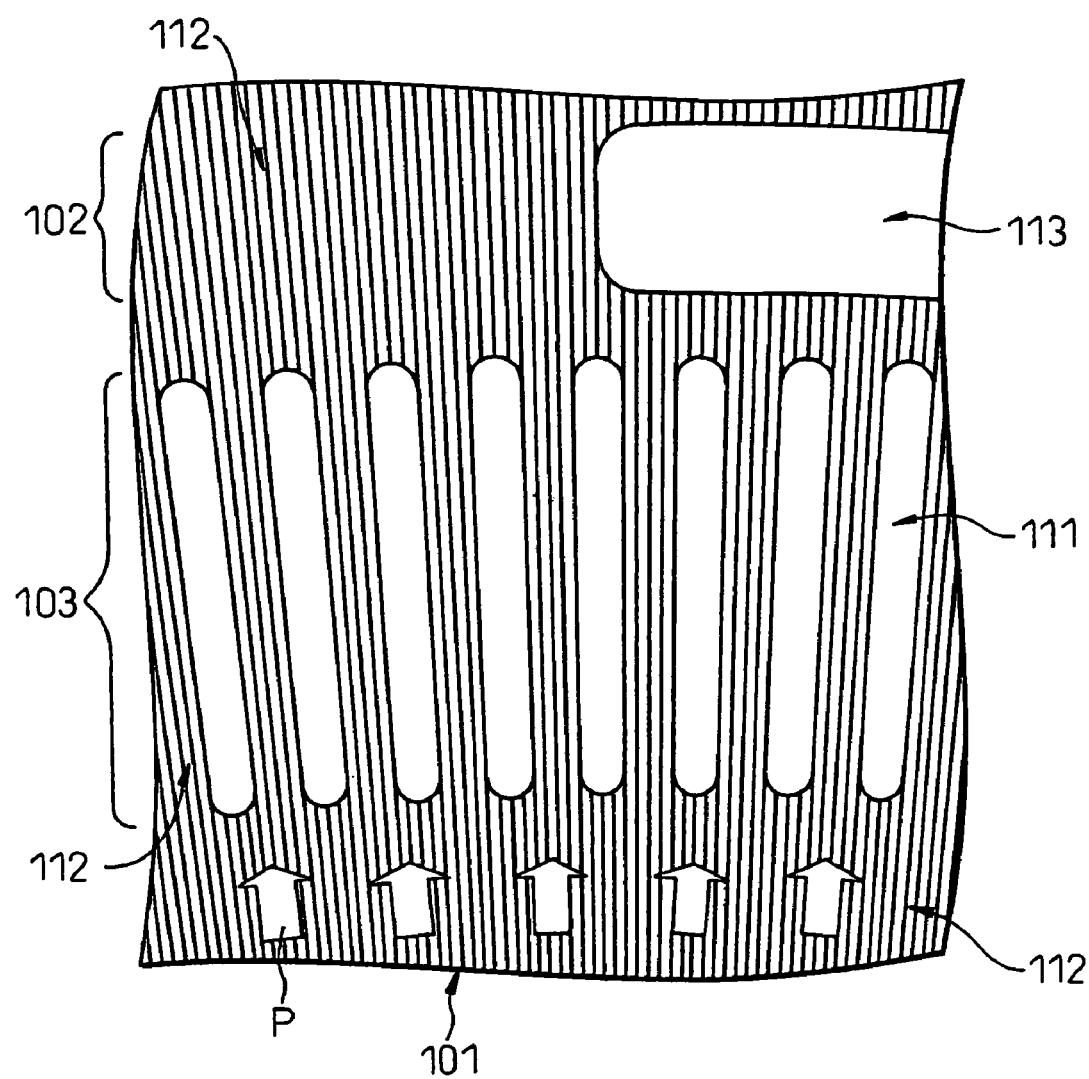

OPTICAL ENCODER WITH RESINOUS CODE PLATE

BACKGROUND OF THE INVENTION

1. Field of the Invention

The present invention relates to an optical encoder with a resinous code plate.

2. Description of the Related Art

An optical encoder generally includes a light emitting section, a light receiving section, and a code plate disposed movably relative to the light emitting section and the light receiving section. The code plate is provided with a code pattern for converting a light input emitted from the light emitting section into a coded-light output to be output toward the light receiving section. This type of optical encoder serves to sense, at the light receiving section, the coded light output as a light transmitted or reflected through the code pattern, so as to detect the displacement of the code plate, and is used for detecting the position or speed of a moving object.

For example, Japanese Unexamined Patent Publication (Kokai) No. 11-287671 (JP11-287671A) discloses an optical encoder with a code plate, the code plate including, on one surface thereof, a plurality of tracks respectively provided with code patterns different from each other. The tracks of the code plate are provided with code-pattern surfaces different from each other, for converting respectively a light input into various coded-light outputs, and are formed on the surface of the code plate in a side-by-side arrangement (e.g., a concentric arrangement) exhibiting a mutually identical extending direction. The code-pattern surface of each track includes a flat surface area and an irregular surface area, adjacent to each other as seen in the extending direction of the track.

The code plate is generally constructed in such a manner that a metal coating, such as a chrome coating, is deposited onto the surface of a glass plate so as to provide a bright/dark code pattern. On the other hand, a code plate formed from a resinous or plastic material (referred to as a resinous code plate, in the present application) is known, which possesses an advantage of mass production at a low cost due to the use of an injection molding technique.

In order to form the above-described code-pattern surface on the resinous code plate, it is conventionally performed to process or form patterned areas, corresponding to the flat surface area and the irregular surface area, on the molding surface of a mold used for molding the resinous code plate from a molten resinous material, and to transfer the shape of the molding surface to the resinous material. However, in the case where an insufficient filling pressure is applied to a resinous material having a low flowability in a molten state, the shape of the molding surface of the mold may be inaccurately transferred to the resinous material.

For example, in the case where the irregular surface area includes a V-groove array, the molten resinous material flows in the mold in a direction corresponding to the longitudinal direction of the respective V-grooves. In this connection, if the irregular surface area of one track is arranged side-by-side relative to the flat surface area of the other track as seen in the flowing direction of the molten resinous material, the filling pressure of the flowing molten resinous material may locally fluctuate about a portion corresponding to the boundary between the irregular surface area and the flat surface area, which may result in incomplete V-grooves.

If the code pattern of the track of the resinous code plate is incompletely formed, the detection accuracy of the optical encoder may be affected.

SUMMARY OF THE INVENTION

It is an object of the present invention to provide an optical encoder with a resinous code plate, in which the molding accuracy of the code pattern of the track can be improved and, thus, a required detection accuracy can be stably ensured.

To accomplish the above object, the present invention provides an optical encoder, comprising a light emitting section; a light receiving section; and a resinous code plate disposed movably relative to the light emitting section and the light receiving section, the resinous code plate including a plurality of tracks respectively provided with molded code-pattern surfaces different from each other, the tracks being formed on a plate face in a side-by-side arrangement exhibiting a mutually identical extending direction; wherein the resinous code plate includes a local structured-surface area formed on the plate face between the tracks arranged side-by-side relative to each other, the local structured-surface area possessing a surface configuration different from the molded code-pattern surfaces of the tracks.

In the above optical encoder, a molded code-pattern surface of each of the plurality of tracks may include a flat surface area and an irregular surface area, adjacent to each other as seen in the extending direction of each track; and the local structured-surface area may be formed between the flat surface area of the molded code-pattern surface of one track and the irregular surface area of the molded code-pattern surface of another track arranged side-by-side relative to the one track.

In this constitution, the irregular surface area of the molded code-pattern surface may include a first linear structure extending in a predetermined direction; and the local structured-surface area may include a second linear structure extending in a direction intersecting the first linear structure of the irregular surface area.

In the case where the resinous code plate comprises a molded article solidified into a certain shape by pouring a molten resinous material into a mold, the tracks may be formed to be arranged side-by-side relative to each other as seen in a flowing direction of the molten resinous material, in the mold, for forming the molded code-pattern surfaces of the tracks.

In this case, the local structured-surface area may include a linear structure extending in a direction intersecting the flowing direction of the molten resinous material between the tracks arranged side-by-side.

The present invention also provides a resinous code plate of an optical encoder, comprising a first track provided with a first molded code-pattern surface for converting a light input into a first coded-light output, the first track being formed on a plate face; a second track provided with a second molded code-pattern surface for converting a light input into a second coded-light output different from the first coded-light output, the second track being formed on the plate face in a side-by-side arrangement exhibiting an extending direction identical to an extending direction of the first track; and a local structured-surface area formed on the plate face between the first track and the second track, the local structured-surface area possessing a surface configuration different from the first molded code-pattern surface and the second molded code-pattern surface.

In the above resinous code plate, each of the first molded code-pattern surface and the second molded code-pattern surface may include a flat surface area and an irregular surface area, adjacent to each other as seen in the extending direction of each of the first track and the second track; and the local structured-surface area may be formed between the flat surface area of the first molded code-pattern surface and the irregular surface area of the second molded code-pattern surface.

In this constitution, the irregular surface area of each of the first molded code-pattern surface and the second molded code-pattern surface may include a first linear structure extending in a predetermined direction; and the local structured-surface area may include a second linear structure extending in a direction intersecting the first linear structure of the irregular surface area.

The second linear structure may extend along a periphery of the flat surface area of the first molded code-pattern surface.

In the case where the resinous code plate comprises a molded article solidified into a certain shape by pouring a molten resinous material into a mold, the first track and the second track may be formed to be arranged side-by-side relative to each other as seen in a flowing direction of the molten resinous material, in the mold, for forming the first molded code-pattern surface and the second molded code-pattern surface.

In this case, the local structured-surface area may include a linear structure extending in a direction intersecting the flowing direction of the molten resinous material between the first track and the second track.

The local structured-surface area may include a groove recessed in the plate face.

Alternatively, the local structured-surface area may include a projection protruding from the plate face.

The present invention further provides a mold for molding a resinous code plate, as described above, from a molten resinous material, comprising a first patterned area for forming the first track; a second patterned area for forming the second track, the second patterned area being arranged upstream of the first patterned area as seen in a flowing direction of a molten resinous material; and a third patterned area for forming the local structured-surface area, the third patterned area being arranged between the first patterned area and the second patterned area as seen in the flowing direction of the molten resinous material.

BRIEF DESCRIPTION OF THE DRAWINGS

The above and other objects, features and advantages of the present invention will become more apparent from the following description of preferred embodiments in connection with the accompanying drawings, wherein:

FIG. 1 is a typical illustration showing the constitution of an optical encoder according to the present invention;

FIG. 6 is a schematic plan view showing the main portion of a resinous code plate as a comparative example;

DETAILED DESCRIPTION

Figure 2A:
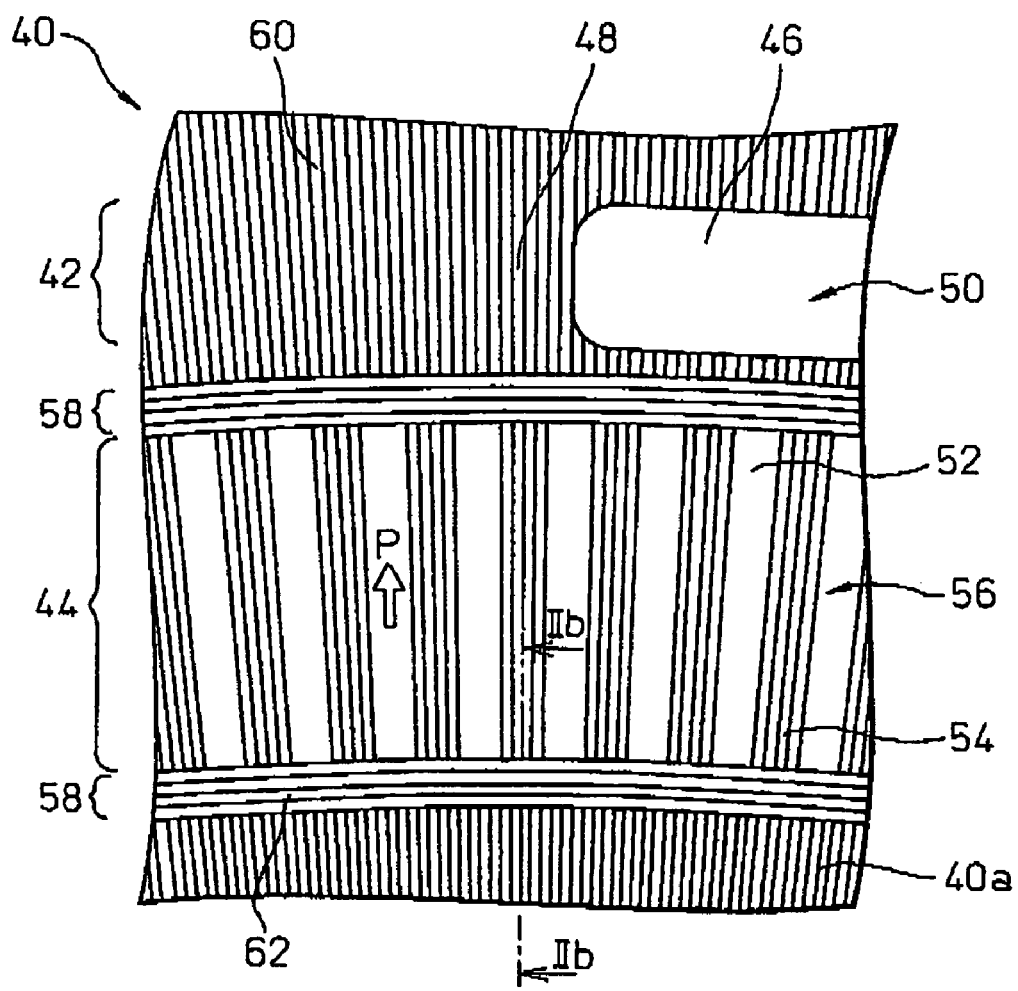
FIG. 2A is a schematic plan view showing the main portion of a resinous code plate, according to one embodiment of the present invention.

The embodiments of the present invention are described below in detail, with reference to the accompanying drawings. In the drawings, the same or similar components are denoted by the same reference numerals.

Figure 5A:
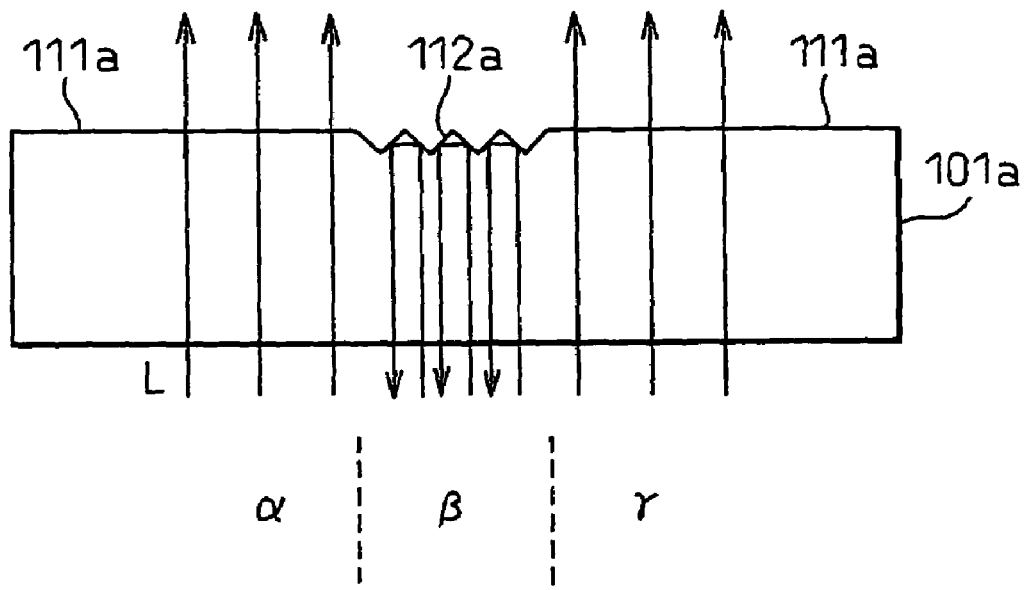
FIGS. 5A and 5B are schematic sectional views illustrating the optical coding principle of a resinous code plate.
Figure 5B:
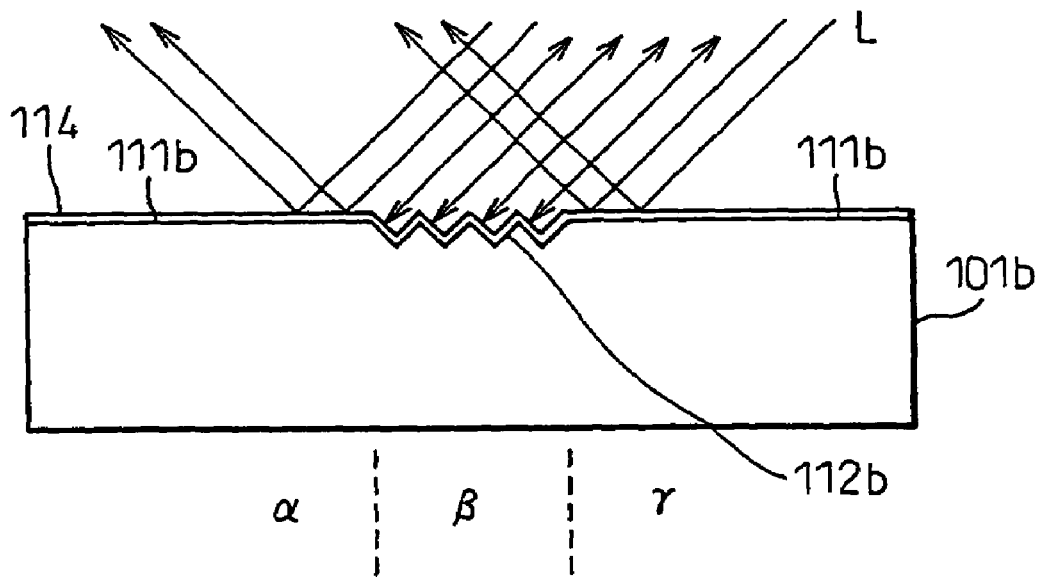

First, referring to FIGS. 5A and 5B, the optical coding principle of a resinous or plastic code plate in a conventional optical encoder will be described below. FIG. 5A shows a resinous code plate 101*a* possessing a light transparency as a whole. FIG. 5B shows a resinous code plate 101*b* possessing a light opacity as a whole.

The resinous code plate 101*a*, shown in FIG. 5A, is provided, on the surface thereof (referred to as a plate face, in the present application), with a molded code-pattern surface including a flat surface area 111*a* and an irregular surface area 112*a*, the latter including a V-grooves array, and serves to encode light by using the reflection of the light on the irregular surface area 112*a*. For example, when a transmitted light is used as a coded light output, a light "L" being incident from a light emitting section (not shown) in a direction normal to the plate face is transmitted through a plate portion having the flat surface area 111*a*, while is reflected in the irregular surface area 112*a*, as illustrated, so that a light receiving section (not shown) senses the flat surface area 111*a* as a bright area and the irregular surface area 112a as a dark area. Contrary to this, when a reflected light is used as a coded light output, the light receiving section senses the flat surface area 111a as a dark area and the irregular surface area 112a as a bright area. Therefore, the flat surface area 111a and the irregular surface area 112a constitute the molded code-pattern surface including contrasted patterns α, β, γ.

The resinous code plate 101b, shown in FIG. 5B, is provided, on the plate face thereof, with a molded code-pattern surface including a flat surface area 111b and an irregular surface area 112b, the latter including a V-groove array, the molded code-pattern surface being coated with a reflecting film 114, and serves to code a light by using the various reflecting directions of the light reflected on the flat and irregular surface areas 111b, 112b. For example, when a light receiving section (not shown) is located at a side opposite to a light emitting section (not shown) about a line normal to the plate face, a light "L" being incident from the light emitting section in a predetermined incident angle to the plate face is reflected in the flat surface area 111b toward the light receiving section, while is reflected in the irregular surface area 112b toward the light emitting section, as illustrated, so that the light receiving section senses the flat surface area 111b as a bright area and the irregular surface area 112b as a dark area. Therefore, the flat surface area 111b and the irregular surface area 112b constitute the molded code-pattern surface including contrasted patterns α, β, γ.

FIG. 6 shows a part of the molded code-pattern surface of a disk-shaped resinous code plate 101, as an is example comparable with the present invention. In the resinous code plate 101, a plurality of tracks 102, 103, having resolutions different from each other, are formed on the plate face in a concentric arrangement. The track 102 having lower resolution is provided with a molded code-pattern surface including a flat surface area 113 and an irregular surface area 112, which are disposed alternately along a circumferential direction at a predetermined pattern-pitch. The track 103 having higher resolution is provided with a molded code-pattern surface including a flat surface area 111 and an irregular surface area 112, which are disposed alternately along a circumferential direction at a predetermined pattern-pitch shorter than the pattern-pitch in the track 102. Thus, the resolution of the track depends on the pattern-pitch on the molded code-pattern surface. In this example, the irregular surface area 112 is constructed from a plurality of V-grooves extending in a radial direction.

The molded code-pattern surface of the resinous code plate 102, shown in FIG. 6, is formed by processing patterned areas, corresponding to the irregular surface area 112 and the flat surface area 111, 113, on the molding surface of a mold used for molding the resinous code plate 101 from a molten resinous material, and transferring the shape of the molding surface to the resinous material. In this connection, the irregular surface areas 112 of the tracks 102, 103 include a V-groove array continuously extending over both areas. Therefore, the molten resinous material flows in the mold, during a molding process, in a direction corresponding to the longitudinal direction of the respective V-grooves in the irregular surface area 112, from the center toward the outer circumference of the resinous code plate 101 (i.e., in a radial direction of the resinous code plate 101), as shown by an arrow "P" in FIG. 6.

Then, referring to FIGS. 7A to 7D and 8A to 8B, the molding process of the molded code-pattern surface of the resinous code plate 101, including only one track 103, will be described below, by way of example.

Figure 7A:
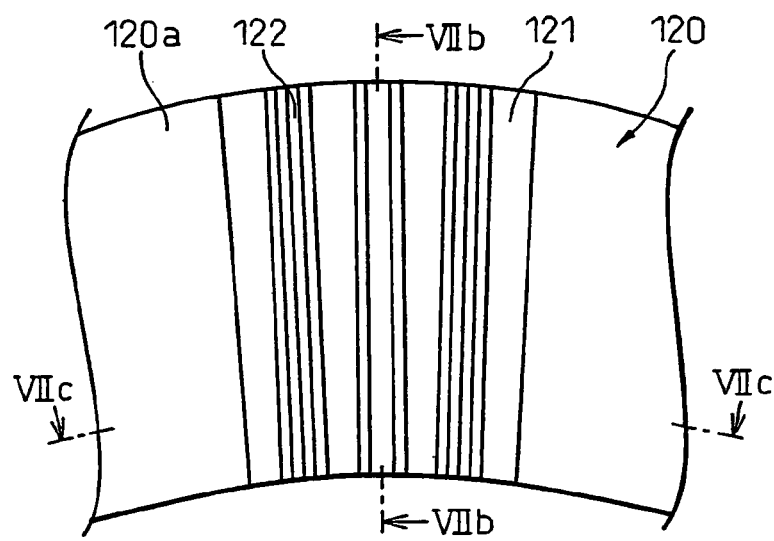
FIG. 7A is a schematic plan view showing the main portion of a mold for molding a resinous code plate as another comparative example.
Figure 7B:
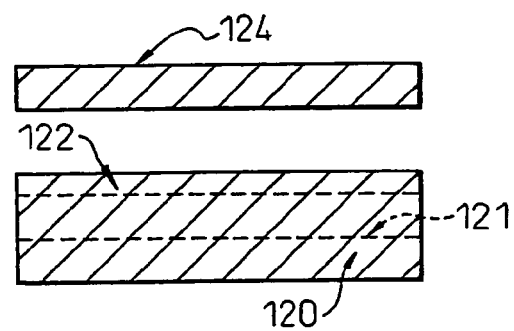
FIG. 7B is a sectional view taken along a line VIIb—VIIb in FIG. 7A.
Figure 7C:
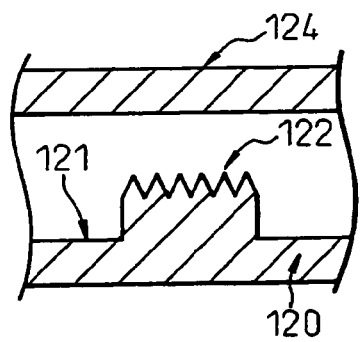
FIG. 7C is a sectional view taken along a line VIIc—VIIc in FIG. 7A.
Figure 7D:
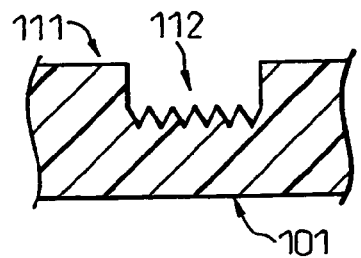
FIG. 7D is an enlarged sectional view showing a part of resinous code plate molded in the mold of FIG. 7A.
Figure 8A:
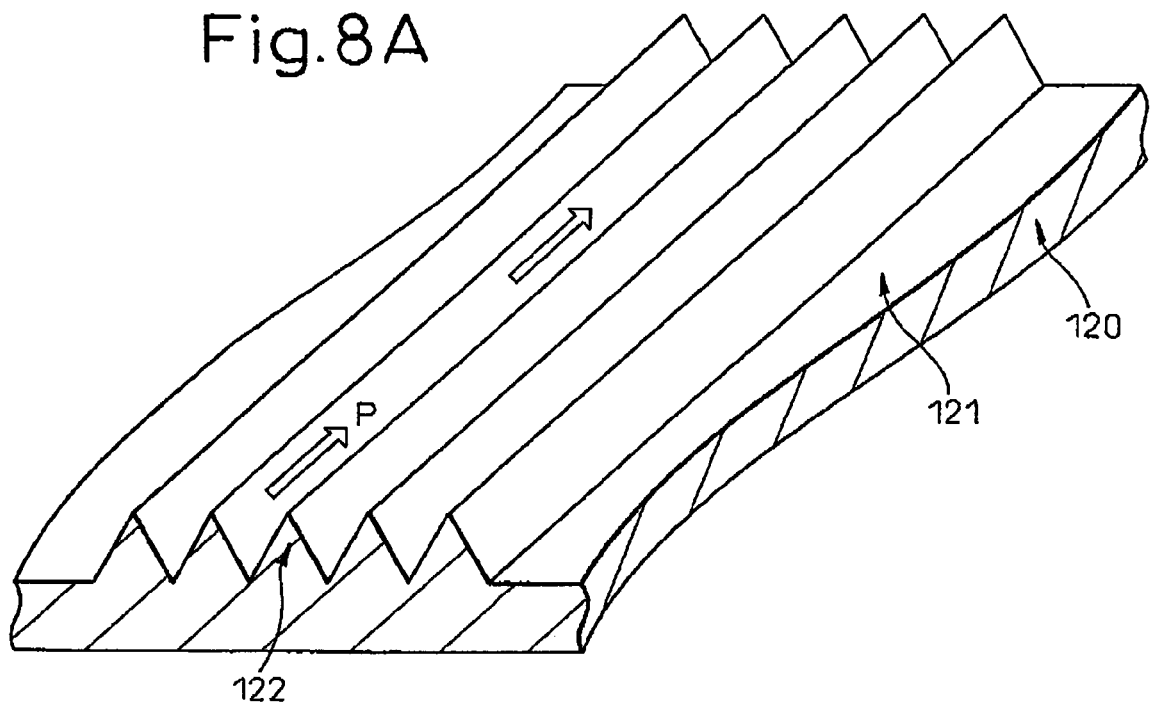
FIG. 8A is a schematic perspective view showing the main portion of the mold of FIG. 7A.
Figure 8B:
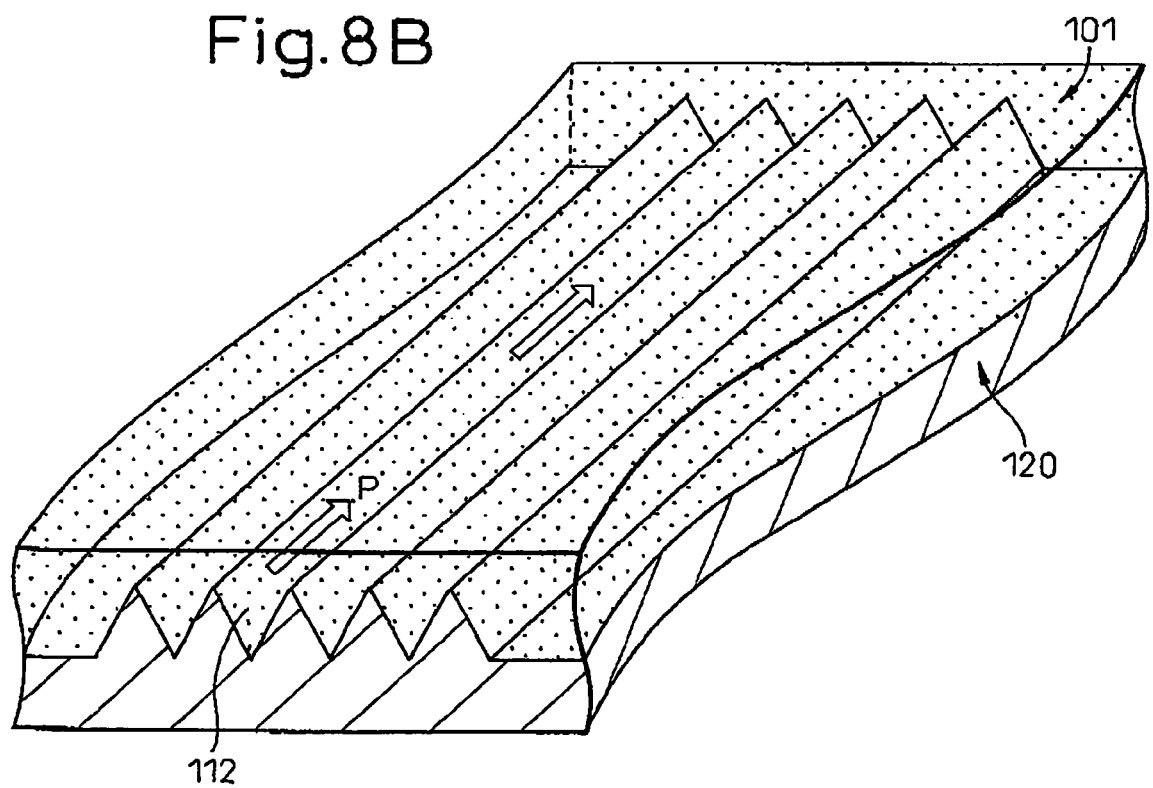
FIG. 8B is a schematic perspective view showing the mold of FIG. 8A, with a molten resinous material poured therein.

A mold 120 is provided, on the molding surface 120a thereof, with a patterned area including a flat-surface shaping section 121 for forming the flat surface area 111 and a v-groove array shaping section 122 for forming the irregular surface area 112 (FIG. 7A). When the mold 120 is combined with an opposing counterpart mold 124 (FIGS. 7B, 7C) and a molten resinous material is poured into a cavity between the molds 120, 124 using, e.g., an injection-molding machine, the molten resinous material flows in the V-groove array shaping section 122 in a direction "P" corresponding to the longitudinal direction of the respective V-grooves, to form the irregular surface area 112 (FIGS. 7D, 8A, 8B).

Next, referring to FIGS. 9A to 9F and 10A to 10B, the molding process of the molded code-pattern surface of the resinous code plate 101, including two tracks 102, 103 having different pattern-pitches as explained above, will be described below.

Figure 9A:
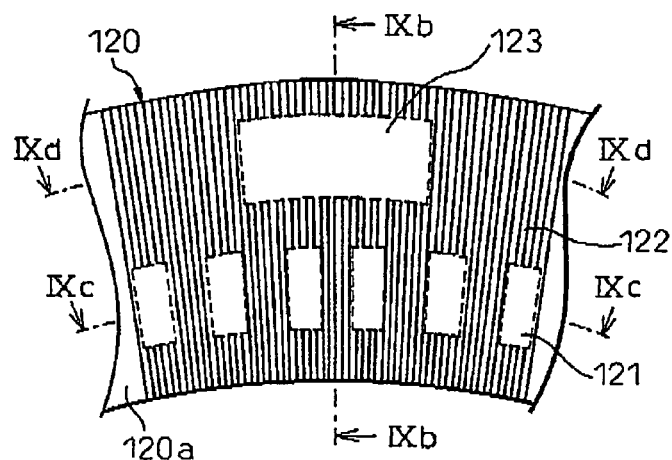
FIG. 9A is a schematic plan view showing the main portion of a mold for molding the resinous code plate of FIG. 6.
Figure 9B:
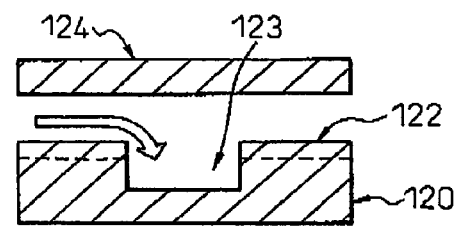
FIG. 9B is a sectional view taken along a line IXb—IXb in FIG. 9A.
Figure 9C:
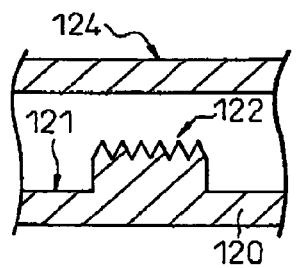
FIG. 9C is a sectional view taken along a line IXc—IXc in FIG. 9A.
Figure 9D:
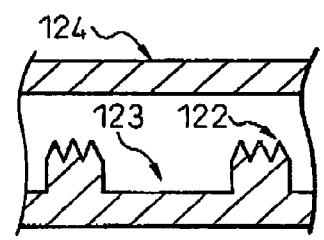
FIG. 9D is a sectional view taken along a line IXd—IXd in FIG. 9A.
Figure 9E:
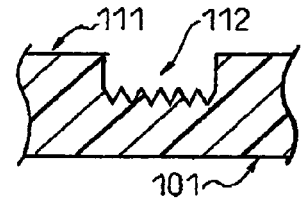
FIGS. 9E and 9F are enlarged sectional views showing a part of resinous code plate of FIG. 6.
Figure 9F:
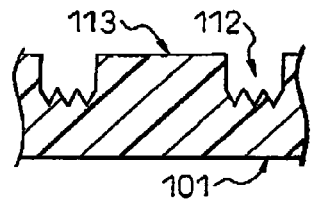
Figure 10A:
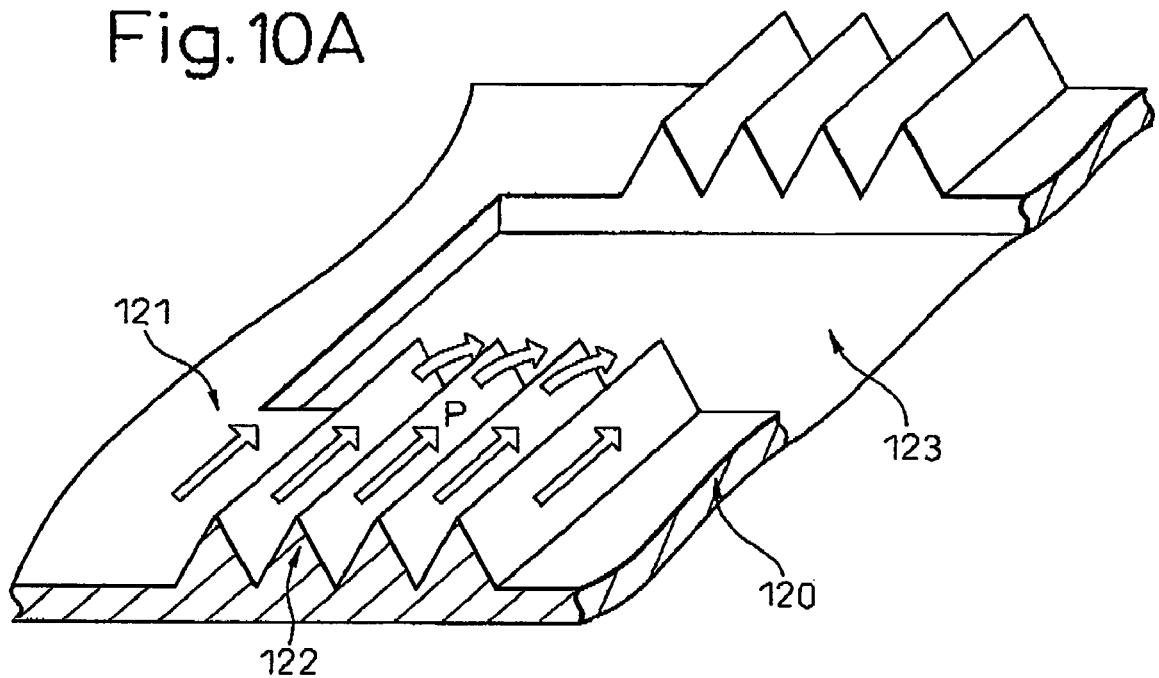
FIG. 10A is a schematic perspective view showing the main portion of the mold of FIG. 9A.
Figure 10B:
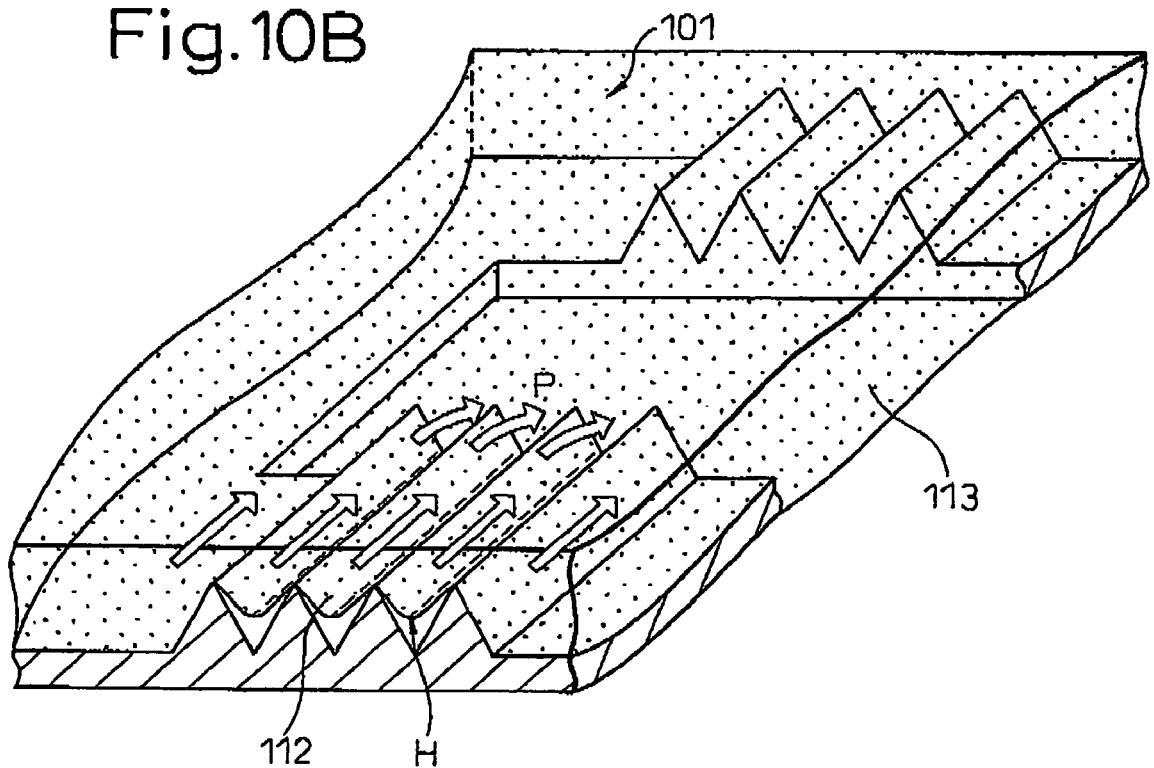
FIG. 10B is a schematic perspective view showing the mold of FIG. 10A, with a molten resinous material poured therein.

A mold 120 is provided, on the molding surface 120a thereof, with a patterned area including a flat-surface shaping section 121 for forming the flat surface area 111, a V-groove array shaping section 122 for forming the irregular surface area 112, and a flat-surface shaping section 123 for forming the flat surface area 113 (FIG. 9A). When the mold 120 is combined with an opposing counterpart mold 124 (FIGS. 9B, 9C, 9D) and a molten resinous material is poured into a cavity between the molds 120, 124 using, e.g., an injection-molding machine, the molten resinous material flows in the V-groove array shaping section 122 in a direction "P" corresponding to the longitudinal direction of the respective V-grooves, so as to form the irregular surface area 112, and then the molten resinous material flows into the flat surface shaping section 123 located downstream, as seen in a resin flowing direction, of the V-groove array shaping section 122 for the track 103, so as to form the flat surface area 113 (FIGS. 9E, 9F, 10A, 10B). In this connection, the volume of the flat-surface shaping section 123 is larger than the volume of each V-groove shaping recess in the V-groove array shaping section 122, so that, at the instant when the molten resinous material flows from the V-groove array shaping section 122 into the flat-surface shaping section 123, the filling pressure of the molten resinous material is lowered.

Such a reduction in a resin pressure in the flat-surface shaping section 123 may affect a resin pressure in the V-groove array shaping section 122 located upstream, and the molten resinous material may not be fully filled into the entire V-groove array shaping section 122, which may result in an incomplete transfer of the shape of the pattered area to the resinous material. Under such a condition, the molded resinous code plate 101 may be provided, in the V-groove array in the irregular surface area 112, with a rounded corner "H" along a ridge line, as shown in, e.g., FIG. 10B.

Figure 11A:
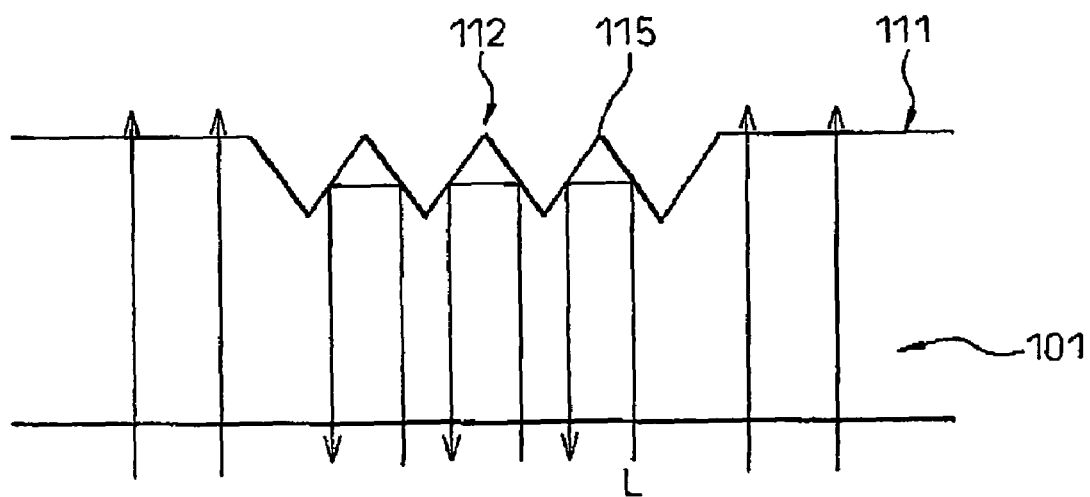
FIGS. 11A and 11B are views illustrating a light leakage in a resinous code plate as a comparative example.
Figure 11B:
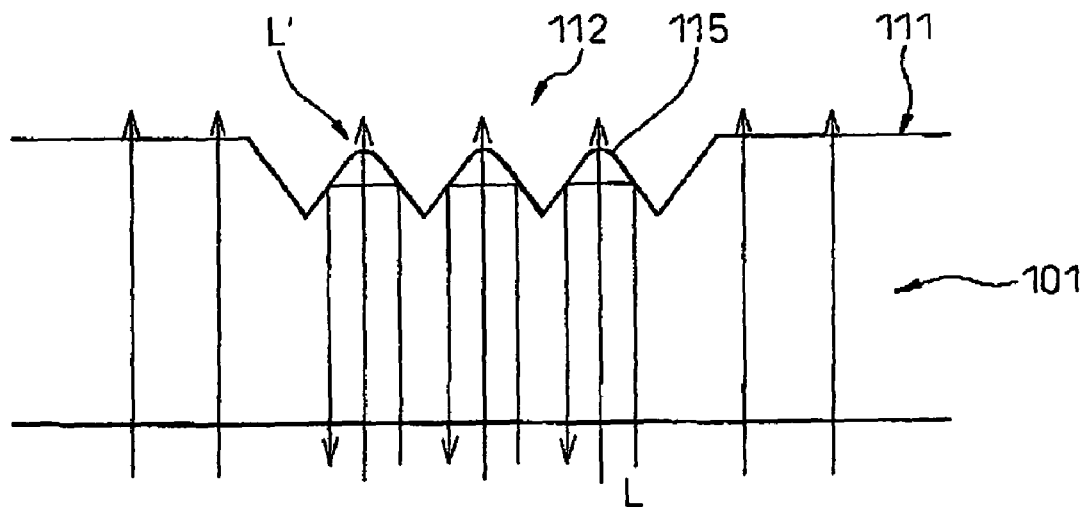

In this connection, as shown in FIG. 11A, in the case where the resinous material is sufficiently filled into a portion 115 corresponding to the ridge line of the V-groove array in the irregular surface area 112 of the resinous code plate 101, the incident light L, as explained by FIG. 5A, is surely reflected in the irregular surface area 112, so that the irregular surface area 112 accurately functions as a dark area when a transmitted light is used as a coded light output. Contrary to this, as shown in FIG. 11D, in the case where the resinous material is not sufficiently filled into a portion 115 corresponding to the ridge line of the V-groove array in the irregular surface area 112 of the resinous code plate 101, a part L' of the incident light L is transmitted through the irregular surface area 112, so that the light shielding function of the dark area, which is to be achieved by the irregular surface area 112, is deteriorated when a transmitted light is used as a coded light output.

Such a change in the light shielding function in the irregular surface area 112 causes a change in a degree of contrast in relation to the flat surface area 111. Consequently, if the shape of the molding surface to the resinous material is unevenly transferred in the molding process of the resinous code plate, the accuracy of interpolation in the detecting process of an optical encoder may be influenced, and it is thus possible that the detection accuracy of the optical encoder is affected by, e.g., the fact that the error in interpolation locally increases at a certain position (or angle) of the resinous code plate.

Referring now to FIG. 1, the basic constitution of an optical encoder 10, according to the present invention, will be described.

The optical encoder 10 includes a light emitting section 12, a light receiving section 14, and a resinous code plate 16 disposed movably relative to the light emitting section 12 and the light receiving section 14 (in a direction shown by an arrow "M"). The resinous or plastic code plate 16 includes a plurality of tracks 22, 24 respectively provided with molded code-pattern surfaces 18, 20 different from each other, for respectively converting a light input emitted from the light emitting section 12 into various coded-light outputs to be output toward the light receiving section 14, the tracks 22, 24 being formed on a plate face 16a in a side-by-side arrangement having a mutually identical extending direction. The resinous code plate 16 also includes a local structured-surface area 26 formed on the plate face 16a between the tracks 22, 24 arranged side-by-side relative to each other. The local structured-surface area 26 possesses a surface configuration different from the surface configuration of the molded code-pattern surfaces 18, 20 of the tracks 22, 24. It should be noted that the term "structured-surface" in the present application means various irregular or texturized surfaces including irregularities such as grooves, ribs, and so on.

In the optical encoder 10 having the above constitution, an intentional local change of pressure is caused in the flow of molten resinous material in the mold at the local structured-surface area 26, during the molding process of the resinous code plate 16 as described later. Thereby, the filling conditions, such as a filling pressure, of the molten resinous material for forming the molded code-pattern surfaces 18, 20 of the tracks 22, 24 arranged adjacent to the local structured-surface area 26, which appears to influence the flowing mode of the resinous material in the mold, are uniform within the respective molded code-pattern surfaces 18, 20, so that it is possible to effectively reduce an unevenness in shape-transferring properties for the molding surface of the mold, which otherwise be caused due to a fluctuation in the filling pressure. As a result, the molding accuracy of the molded code-pattern surfaces 18, 20 of the respective tracks 22, 24 in the resinous code plate 16 is improved, the degree of contrast in the molded code-pattern surfaces 18, 20 is uniform and, thus, the influence on the accuracy of interpolation in the detecting process of the optical encoder 10 is eliminated, so that it is possible to stably ensure the required detection accuracy of the optical encoder 10.

The local structured-surface area 26, described above, may include various surface configurations as described later. Also, the local structured-surface area 26 is not restricted to be provided between the tracks 22, 24 arranged side-by-side as illustrated, but may be provided at at least one, preferably both, of upstream and downstream sides for one track as seen in the flowing direction of the molten resinous material in the molding process. The material of the resinous code plate 16 may be a transparent resin, or may be an opaque resin.

In the above constitution, each of the molded code-pattern surfaces 18, 20 of the tracks 22, 24 includes a flat surface area 28, 30 and an irregular surface area 32, 34, adjacent to each other as seen in the extending direction of each track 22, 24. The molded code-pattern surface 18 of the track 22 is constituted in such a manner as to dispose, alternately, the flat surface area 28 and the irregular surface area 32 along the extending direction of the track 22 at a predetermined pattern-pitch, while the molded code-pattern surface 20 of the track 24 is constituted in such a manner as to dispose, alternately, the flat surface area 30 and the irregular surface area 34 along the extending direction of the track 24 at a predetermined pattern-pitch shorter than the pattern pitch in the track 22. Accordingly, in the illustrated constitution, the track 24 has a resolution higher than that of the track 22. Further, the local structured-surface area 26 is formed between the relatively wider flat surface area 28 of the molded code-pattern surface 18 of the track 22 and the relatively narrower irregular surface area 34 of the molded code-pattern surface 20 of the track 24.

According to the above constitution, it is possible to prevent the flow of the molten resinous material, for forming the relatively wider flat surface area 28 in one track 22, from affecting, in the mold, the flow of the molten resinous material for forming the relatively narrower irregular surface area 34 in the other track 24, during the molding process of the resinous code plate 16, as described later.

Figure 2B:
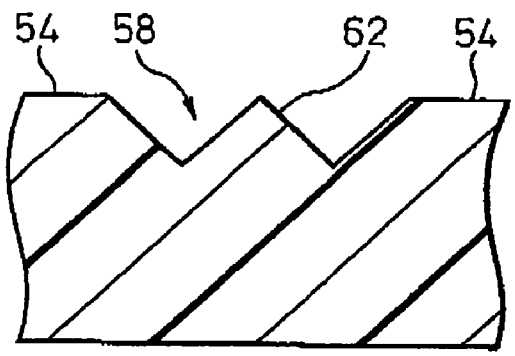
FIG. 2B is a sectional view taken along a line IIb—IIb in FIG. 2A.

FIGS. 2A and 2B show a part of a molded code-pattern surface in a disk-shaped resinous code plate 40, according to one embodiment of the present invention. The resinous or plastic code plate 40 has a constitution as to be incorporated in a rotary encoder, and includes a plurality of tracks 42, 44 having resolutions different from each other and formed on the plate face 40a thereof in a concentric arrangement so as to respectively extend annularly about a rotary axis (not shown). The first track 42 having lower resolution is provided with a first molded code-pattern surface 50 for converting a light input into a first coded-light output, the first molded code-pattern surface 50 including a flat surface area 46 and an irregular surface area 48, which are disposed alternately along a circumferential direction at a predetermined pattern-pitch. The second track 44 having higher resolution is provided with a second molded code-pattern surface 56 for converting a light input into a second coded-light output different from the first coded-light output, the second molded code-pattern surface 56 including a flat surface area 52 and an irregular surface area 54, which are disposed alternately along a circumferential direction at a predetermined pattern-pitch shorter than the pattern-pitch in the first track 42.

The resinous code plate 40 also includes a local structured-surface area 58 formed on the plate face 40a between the first and second tracks 42, 44. The local structured-surface area 58 possesses a surface configuration different from the surface configuration of the first and second molded code-pattern surfaces 50, 56.

The irregular surface area 48, 54 of each of the first and second molded code-pattern surfaces 50, 56 includes a first linear structure 60 extending in a predetermined direction (a radial direction, in the illustrated embodiment). In the illustrated embodiment, each irregular surface area 48, 54 includes a plurality of first linear structures 60 arranged side-by-side in a circumferential direction at a fine pitch, the respective first linear structures 60 in the first and second molded code-pattern surfaces 50, 56 being aligned with each other in the radial direction. The local structured-surface area 58 includes a second linear structure 62 extending in a direction intersecting (perpendicular to, in the illustrated embodiment) the first linear structures 60 of the respective irregular surface areas 48, 54. It should be noted that each irregular surface area 48, 54 may be constituted by one or more first linear structures 60, each composed of a V-groove recessed in the plate face 40a or a V-ridge protruding from the plate face 40a. Also, the local structured-surface area 58 may be constituted by one or more second linear structures 62.

The resinous code plate 40 having the above-described molded code-pattern surface configuration is formed as a molded article solidified into a certain shape by pouring a molten resinous material into a mold. The first and second tracks 42, 44 are formed to be arranged side-by-side relative to each other as seen in a flowing direction "P" of the molten resinous material, in the mold, for forming the first and second molded code-pattern surfaces 50, 56. In this connection, the flowing direction "P" of the molten resinous material in the mold is determined on the basis of the extending direction of the first linear structures 60 constituting the irregular surface areas 48, 54 of the first and second molded code-pattern surfaces 50, 56, which is, in the illustrated embodiment, a radial direction from the center toward the outer circumference of the resinous code plate 40. The second linear structure 62 constituting the local structured-surface area 58 extends in a circumferential direction perpendicular to the flowing direction "P" of the molten resinous material, between the first track 42 located downstream in a resin flowing direction and the second track 44 located upstream in the resin flowing direction.

The local structured-surface area 58 may be formed, between the first and second tracks 42, 44, annularly along the entire circumference of the resinous code plate 40 or only within a desired angle range in the circumferential direction. However, it is advantageous that local structured-surface area 58 is formed so as to extend at least along a periphery of the flat surface area 46 of the first molded code-pattern surface 50 located downstream in the resin flowing direction. According to this arrangement, between the first and second molded code-pattern surfaces 50, 56 arranged side-by-side in the radial direction, the relatively narrower irregular surface area 54 located upstream in the resin flowing direction is substantially separated from the relatively wider flat surface area 46 located downstream in the resin flowing direction, by the local structured surface area 58, from the viewpoint of a resin flow. As a result, it is possible to prevent, during the molding process of the resinous code plate 40, the flow of the molten resinous material for forming the relatively wider flat surface area 46 in the first track 42 in the mold from affecting the molten resinous material for forming the relatively narrower irregular surface area 54 in the second track 44.

It should be noted that the extending direction of the second linear structure 62 of the local structured-surface area 58 is not limited to the direction perpendicular to the resin flowing direction "P", but may be any direction at a certain angle, other than a right angle, with the resin flowing direction "P", provided that the local structured-surface area 58 has no influence on the light coding functions of the first and second tracks 42, 44 located at both sides of the local structured-surface area 58. In this connection, if the second linear structure 62 of the local structured-surface area 58 is formed as a light interrupting portion extending annularly between the first and second tracks 42, 44 for a light incident to the tracks 42, 44, the influence on the light coding functions of the first and second tracks 42, 44 is eliminated. Also, it is advantageous to provide the local structured-surface area 58 at both the upstream and the downstream sides for one track (the second track 44 in the drawing) as seen in the flowing direction "P" of the molten resinous material in the molding process. Further, in a resinous code plate including three or more tracks having molded code-pattern surfaces different from each other, the local structured-surface area may be provided at at least one of upstream and downstream sides for every one track as seen in the resin flowing direction.

The local structured-surface area 58 may include a groove recessed in the plate face 40a. In the case where the local structured-surface area 58 includes the second linear structure 62, the groove may be composed of a V-groove (FIG. 2B), a trapezoidal groove, a rounded groove, and so on. Also, the groove is not restricted to the linear structure, but may be a dispersedly arrangeable groove such as a dimple. Alternatively, the local structured-surface area 58 may include a projection protruding from the plate face 40a. In the case where the local structured-surface area 58 includes the second linear structure 62, the projection may be composed of a V-ridge, a trapezoidal ridge, a rounded ridge, and so on. Also, the projection is not restricted to the linear structure, but may be a dispersedly arrangeable projection such as a bump.

The local structured-surface area 58 is provided for causing an intentional local change of pressure in the flow of molten resinous material in the mold, and thus may be formed at a desired position on a path of resin flow, in the case where a resin flowing direction in the molding process of the resinous code pate 40 is other than a direction from the center to the outer circumference. From the similar viewpoint, in the case where the local structured-surface area 58 includes the second linear structure 62, the second linear structure 62 may extend in various directions intersecting various resin flowing direction established in the molding process.

Thus, provided that the local structured-surface area 58 has a surface configuration and/or a location capable of causing an intentional local change of pressure in the flow of molten resinous material in the mold, the filling conditions, such as a filling pressure, of the molten resinous material for forming the molded code-pattern surfaces 50, 56 of the first and second tracks 42, 44 arranged adjacent to the local structured-surface area 58, which appears to influence the flowing mode of the resinous material in the mold, are uniform within the respective molded code-pattern surfaces 50, 56, so that it is possible to effectively reduce an unevenness in shape-transferring properties for the molding surface of the mold, which otherwise be caused due to the fluctuation of the filling pressure. As a result, the molding accuracy of the molded code-pattern surfaces 50, 56 of the first and second tracks 42, 44 in the resinous code plate 40 is improved, so that it is possible to stably ensure the required detection accuracy of the optical encoder.

Figure 3A:
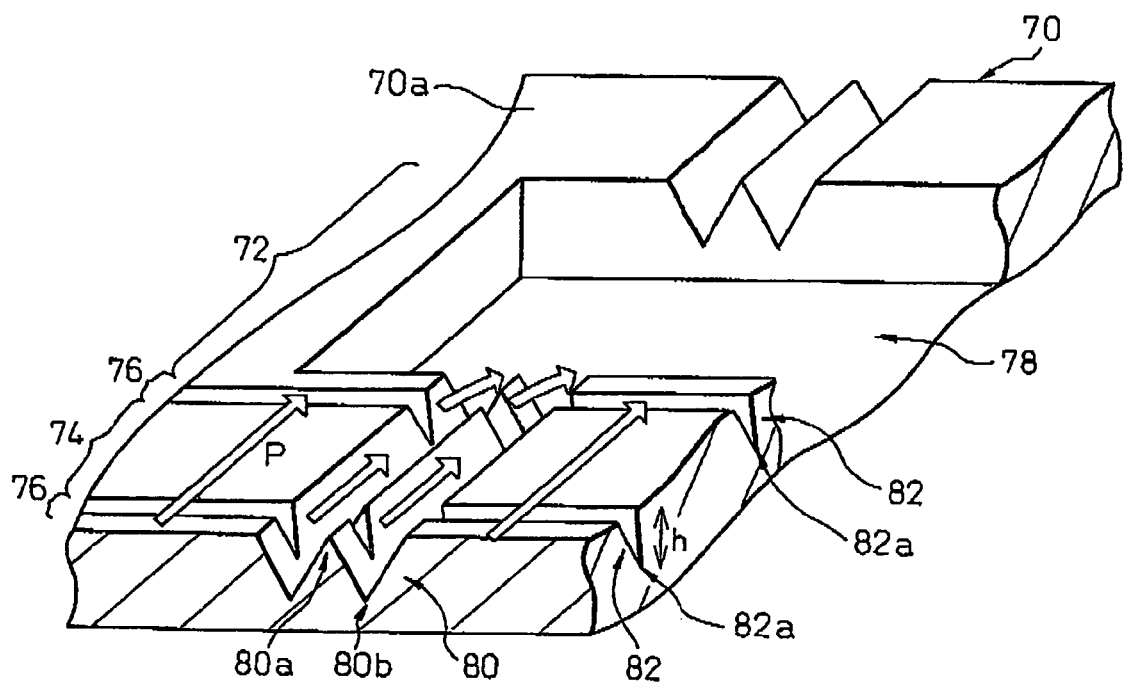
FIG. 3A is a schematic perspective view showing the main portion of a mold for molding the resinous code plate of FIG. 2A.
Figure 3B:
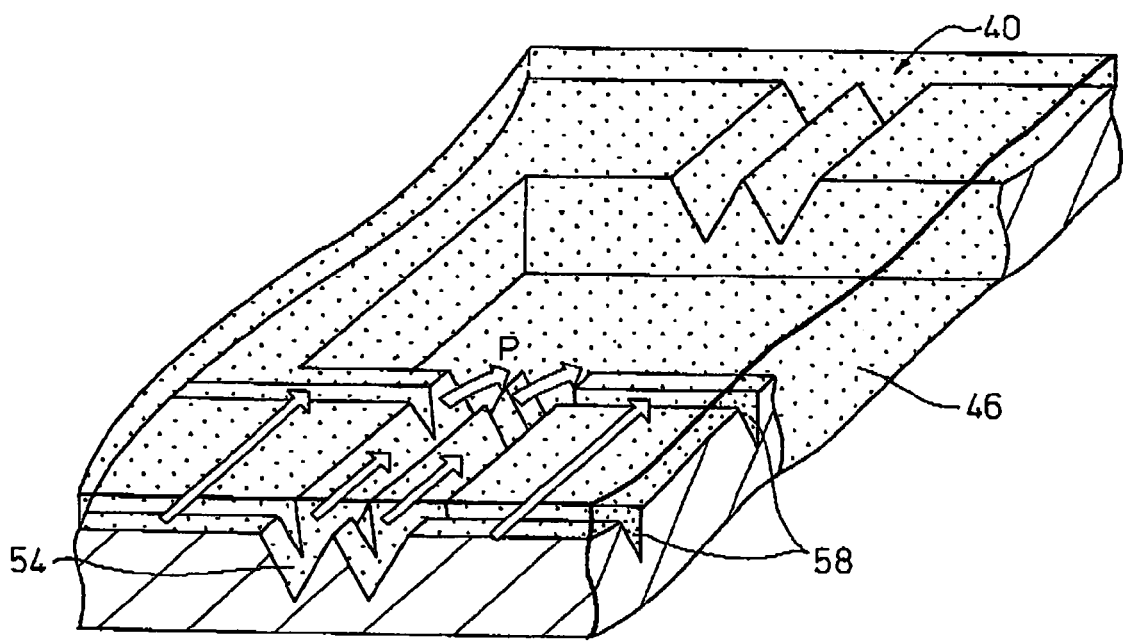
FIG. 3B is a schematic perspective view showing the mold of FIG. 3A, with a molten resinous material poured therein.

FIGS. 3A and 3B schematically show the main portion of a mold 70 for molding the resinous code plate 40 described above. The mold 70 is provided, in the molding surface 70a thereof, with a first patterned area 72 for forming the first track 42 of the resinous code plate 40; a second patterned area 74 for forming the second track 44 of the resinous code plate 40, the second patterned area 74 being arranged upstream of the first patterned area 72 as seen in the flowing direction "P" of a molten resinous material; and a third patterned area 76 for forming the local structured-surface area 58 of the resinous code pate 40, the third patterned area 76 being arranged between the first patterned area 72 and the second patterned area 74 as seen in the flowing direction "P" of the molten resinous material. The third patterned area 76 for forming the local structured-surface area 58 is also provided at a side upstream of the second patterned area 74 as seen in the flowing direction "P" of the molten resinous material.

In the mold 70, the first patterned area 72 includes a flat-surface shaping section 78 for forming the flat surface area 46 of the first track 42; the second patterned area 74 includes a V-groove array shaping section 80 for forming the irregular surface area 54 of the second track 44; and each of the third patterned area 76 includes a transverse-groove shaping section 82 for forming the local structured-surface area 58. In FIGS. 3A and 3B, to allow easy understanding, the V-groove array shaping section 80 is shown only by one root forming portion 80a for forming a root of the V-groove array and two ridge forming portions 80b for forming ridges of the V-groove array, in the irregular surface area 54 of the second track 44 of the resinous code plate 40. However, the V-groove array shaping section 80 is actually composed of plural root forming portions 80a and plural ridge forming portions 80b, arranged alternately with each other. Similarly, the transverse-groove shaping section 82 is shown only by one ridge forming portion 82a for forming a ridge of the V-groove array in the local structured-surface area 58 of the resinous code plate 40, but is actually composed of plural root forming portions (not shown) and plural ridge forming portions 82a, arranged alternately with each other. In this connection, the depth "h" of the ridge forming portion 82a of the transverse-groove shaping section 82 may be desirably determined, and may be deeper or shallower than the depth of the ridge forming portion 80b of the V-groove array shaping section 80. Also, the V-groove array shaping section for forming the irregular surface area 48 of the first track 42 is not illustrated as a matter of convenience.

When the mold 70 is combined with an opposing counterpart mold (not shown) and a molten resinous material is poured into a cavity between these molds by using, e.g., an injection-molding machine, the molten resinous material flows in the V-groove array shaping section 80 in a direction "P" corresponding to the longitudinal direction of the respective V-grooves, so as to form the irregular surface area 54, and then the molten resinous material flows into the flat-surface shaping section 78 located downstream of the V-groove array shaping section 80, as seen in the resin flowing direction, so as to form the flat surface area 46. During this period, the filling pressure is fully applied to the ridge forming portion 82a of the V-groove array shaping section 80 so as to fill the resinous material therein.

Just before the molten resinous material flows into the flat-surface shaping section 78 from the V-groove array shaping section 80, the pressure of the molten resinous material is locally changed at the transverse-groove shaping section 82 arranged orthogonal to the V-groove array shaping section 80. Such a local change in the filling pressure acts to substantially interrupt the mutual influence of pressure between the molten resinous materials in both sides, as seen in the resin flowing direction, of a portion generating the local pressure change. Particularly, in the illustrated constitution, the V-groove array shaping section 80 is arranged between two transverse-groove shaping sections 82 at the upstream and downstream sides, as seen in the resin flowing direction "P", so that the filling pressure in the V-groove array shaping section 80 is substantially determined solely by the configuration of the transverse-groove shaping sections 82. As a result, it is possible to remove the influence of the reduction in pressure, generated in the molten resinous material flowing into the flat-surface shaping section 78 arranged downstream of the V-groove array shaping section 80, on the molten resinous material flowing along the V-groove array shaping section 80.

Figure 4A:
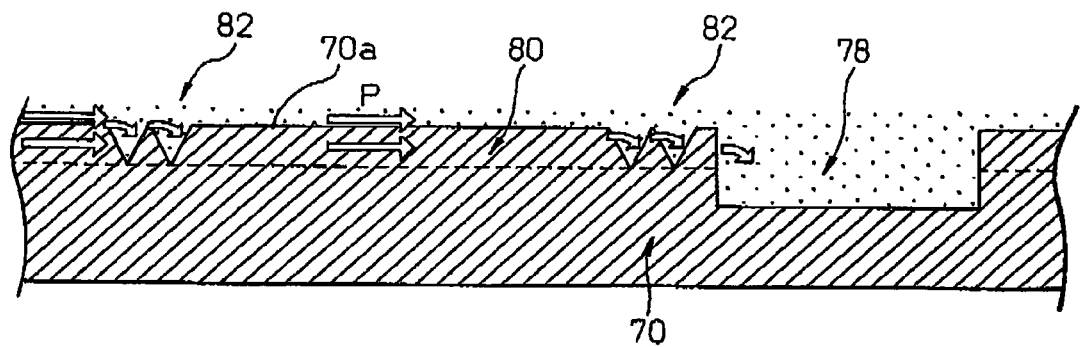
FIG. 4A is a schematic sectional view illustrating a resin flowing mode in the mold of FIG. 3A.
Figure 4B:
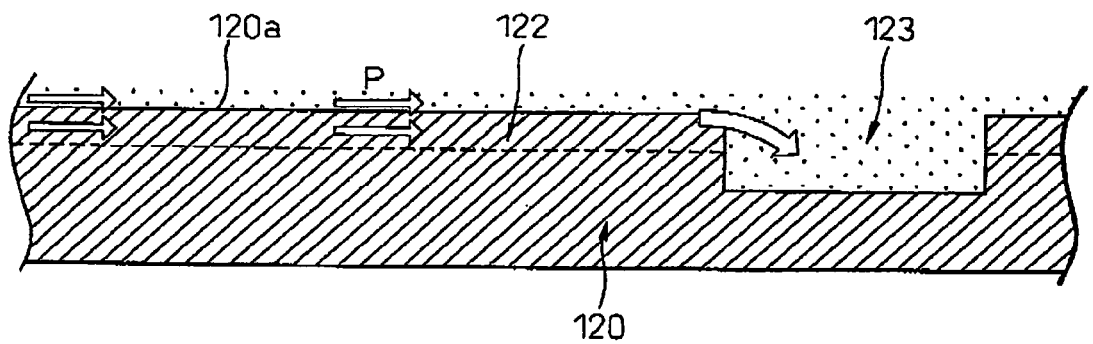
FIG. 4B is a schematic sectional view illustrating a resin flowing mode in a mold as a comparative example.

Next, referring to FIGS. 4A and 4B, the flowing modes of the molten resinous material, in the mold 70 and in the comparative example mold 120 (FIG. 10A), are described in comparison with each other.

As shown in FIG. 4A, in the mold 70, the transverse-groove shaping sections 82 are provided at both sides of the V-groove array shaping section 80 in the resin flowing direction, so that, even when the relatively wider flat-surface shaping section 78, which may act as a resin reservoir, is arranged at the downstream side, the molten resinous material flowing along the V-groove array shaping section 80 is not affected by the flat-surface shaping section 78, and thus can maintain the pressure thereof at a generally even level between two transverse-groove shaping sections 82, which results in the uniform filling pressure. As a result, in the V-groove array shaping section 80, the irregular surface area 54 is molded with a high accuracy, similar to a case where no flat-surface shaping section is arranged at a downstream side. In this connection, although the transverse-groove shaping sections 82 may have a slight influence, of a reduction in the filling pressure, on the molten resinous material flowing along the V-groove array shaping section 80, the shape-transferring properties for the molding surface 70a of the mold 70 is improved in its entirety because the influence of a significant reduction in pressure, due to the flat-surface shaping section 78, is substantially eliminated.

Contrary to this, as shown in FIG. 4B, the molten resinous material flowing along the V-groove array shaping section 122, in the mold 120, is affected by a reduction in pressure generated at the instant when the molten resinous material flows into the flat-surface shaping section 123 arranged at the downstream side in the resin flowing direction, which in turn causes a reduction in pressure in the V-groove array shaping section 122. As a result, an unevenness in shape-transferring properties for the molding surface 120a of the mold 120 is caused in the V-groove array shaping section 122, in accordance with the location of the flat-surface shaping section 123.

While the invention has been described with reference to specific preferred embodiments, it will be understood by those skilled in the art that various changes and modifications may be made thereto without departing from the spirit and scope of the following claims.

The invention claimed is:

1. An optical encoder, comprising:
   a light emitting section;
   a light receiving section; and
   a resinous code plate disposed movably relative to said light emitting section and said light receiving section, said resinous code plate including a plurality of tracks respectively provided with molded code-pattern surfaces different from each other, said tracks being formed on a plate face in a side-by-side arrangement exhibiting a mutually identical extending direction;
   wherein said resinous code plate includes a local structured-surface feature formed on said plate face between said tracks arranged side-by-side relative to each other, said local structured-surface feature possessing a surface configuration different from said molded code-pattern surfaces of said tracks and includes either one of a plurality of grooves recessed in said plate face or a plurality of projections protruding from said plate face.

2. An optical encoder, as set forth in claim 1, wherein a molded code-pattern surface of each of said plurality of tracks includes a flat surface area and an irregular surface area, adjacent to each other as seen in the extending direction of each track; and wherein said local structured-surface feature is formed between said flat surface area of said molded code-pattern surface of one track and said irregular surface area of said molded code-pattern surface of another track arranged side-by-side relative to said one track.

3. An optical encoder, as set forth in claim 2, wherein said irregular surface area of said molded code-pattern surface includes a first linear structure extending in a predetermined direction; and wherein said local structured-surface feature includes a second linear structure extending in a direction intersecting said first linear structure of said irregular surface area.

4. An optical encoder, as set forth in claim 1, wherein said resinous code plate comprises a molded article solidified into a certain shape by pouring a molten resinous material into a mold; and wherein said plurality of tracks are formed to be arranged side-by-side relative to each other as seen from a flowing direction of the molten resinous material, in the mold, for forming said molded code-pattern surfaces of said tracks.

5. An optical encoder, as set forth in claim 4, wherein said local structured-surface feature includes a linear structure extending in a direction intersecting said flowing direction of said molten resinous material between said tracks arranged side-by-side.

6. A resinous code plate of an optical encoder, comprising:
a first track provided with a first molded code-pattern surface for converting a light input into a first coded-light output, said first track being formed on a plate face;
a second track provided with a second molded code-pattern surface for converting a light input into a second coded-light output different from said first coded-light output, said second track being formed on said plate face in a side-by-side arrangement exhibiting an extending direction identical to an extending direction of said first track; and
a local structured-surface feature formed on said plate face between said first track and said second track, said local structured-surface feature possessing a surface configuration different from said first molded code-pattern surface and said second molded code-pattern surface and includes either one of a plurality of grooves recessed in said plate face or a plurality of projections protruding from said plate face.

7. A resinous code plate, as set forth in claim 6, wherein each of said first molded code-pattern surface and said second molded code-pattern surface includes a flat surface area and an irregular surface area, adjacent to each other as seen in the extending direction of each of said first track and said second track; and wherein said local structured-surface feature is formed between said flat surface area of said first molded code-pattern surface and said irregular surface area of said second molded code-pattern surface.

8. A resinous code plate, as set forth in claim 7, wherein said irregular surface area of each of said first molded code-pattern surface and said second molded code-pattern surface includes a first linear structure extending in a predetermined direction; and wherein said local structured-surface feature includes a second linear structure extending in a direction intersecting said first linear structure of said irregular surface area.

9. A resinous code plate, as set forth in claim 8, wherein said second linear structure extends along a periphery of said flat surface area of said first molded code-pattern surface.

10. A resinous code plate, as set forth in claim 6, comprising a molded article solidified into a certain shape by pouring a molten resinous material into a mold; wherein said first track and said second track are formed to be arranged side-by-side relative to each other as seen in a flowing direction of the molten resinous material, in the mold, for forming said first molded code-pattern surface and said second molded code-pattern surface.

11. An optical encoder, as set forth in claim 10, wherein said local structured-surface feature includes a linear structure extending in a direction intersecting said flowing direction of said molten resinous material between said first track and said second track.

12. A mold for molding a resinous code plate, as set forth in claim 6, from a molten resinous material, comprising:
a first patterned area for forming said first track;
a second patterned area for forming said second track, said second patterned area being arranged upstream of said first patterned area as seen in a flowing direction of a molten resinous material; and
a third patterned area for forming said local structured-surface feature, said third patterned area being arranged between said first patterned area and said second patterned area as seen from the flowing direction of the molten resinous material.

\* \* \* \* \*